United States Patent
Joshi

(10) Patent No.: US 10,291,473 B2
(45) Date of Patent: May 14, 2019

(54) ROUTING POLICY IMPACT SIMULATION

(71) Applicant: Prabodh Joshi, Windsor, CO (US)

(72) Inventor: Prabodh Joshi, Windsor, CO (US)

(73) Assignee: CA, Inc., New York, NY (US)

(*) Notice: Subject to any disclaimer, the term of this patent is extended or adjusted under 35 U.S.C. 154(b) by 350 days.

(21) Appl. No.: 14/675,042

(22) Filed: Mar. 31, 2015

(65) Prior Publication Data

US 2016/0294691 A1    Oct. 6, 2016

(51) Int. Cl.
*H04L 12/26* (2006.01)
*H04L 12/24* (2006.01)

(52) U.S. Cl.
CPC ........ *H04L 41/0893* (2013.01); *H04L 41/145* (2013.01); *H04L 43/08* (2013.01)

(58) Field of Classification Search
CPC .......... H04L 45/70; H04L 43/02; H04L 43/04
See application file for complete search history.

(56) References Cited

U.S. PATENT DOCUMENTS

| | | | | |
|---|---|---|---|---|
| 6,728,214 B1* | 4/2004 | Hao | | H04L 12/2697 370/241 |
| 2012/0147742 A1* | 6/2012 | Kitamori | | H04L 12/2697 370/225 |
| 2012/0207039 A1* | 8/2012 | Srinivasan | | H04L 47/2441 370/252 |
| 2013/0286857 A1* | 10/2013 | Qian | | H04L 41/0686 370/244 |
| 2014/0169183 A1* | 6/2014 | Allan | | H04L 41/12 370/248 |
| 2016/0057040 A1* | 2/2016 | Bergeron | | H04L 43/04 370/252 |

* cited by examiner

*Primary Examiner* — Noel R Beharry
*Assistant Examiner* — Pamit Kaur
(74) *Attorney, Agent, or Firm* — Baker Botts L.L.P.

(57) ABSTRACT

A method includes receiving network monitoring data for a plurality of internet protocol ("IP") packets, each having been routed along a respective initial path according to a predetermined policy by a routing node. The method also includes receiving a proposed policy designed to cause an intended change in routing future IP packets and generating a corresponding simulation packet for each of the plurality of IP packets based on the network monitoring data. The method still further includes routing each of the simulation packets along a respective simulated path according to the proposed policy to simulate routing the future IP packets and determining, for a particular IP packet, a deviation between the respective simulated path for the corresponding simulation packet and the respective initial path. The method additionally includes determining whether to apply the proposed policy to the routing node based on whether the intended change in routing includes the deviation.

20 Claims, 3 Drawing Sheets

ROUTING POLICY IMPACT SIMULATION

BACKGROUND

The disclosure relates generally to routing, and more specifically to routing policy impact simulation.

SUMMARY

According to one embodiment of the disclosure, a method includes receiving network monitoring data for a plurality of internet protocol ("IP") packets, each having been routed along a respective initial path according to a predetermined policy by a routing node in a packet-switched network. The method also includes receiving a proposed policy designed to cause an intended change in routing future IP packets. The method further includes generating a corresponding simulation packet for each of the plurality of IP packets based on the network monitoring data. The method additionally includes routing each of the simulation packets along a respective simulated path according to the proposed policy to simulate routing the future IP packets. The method still further includes determining, for a particular IP packet in the plurality of IP packets, a deviation between the respective simulated path for the corresponding simulation packet and the respective initial path and determining whether to apply the proposed policy to the routing node based on whether the intended change in routing includes the deviation.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
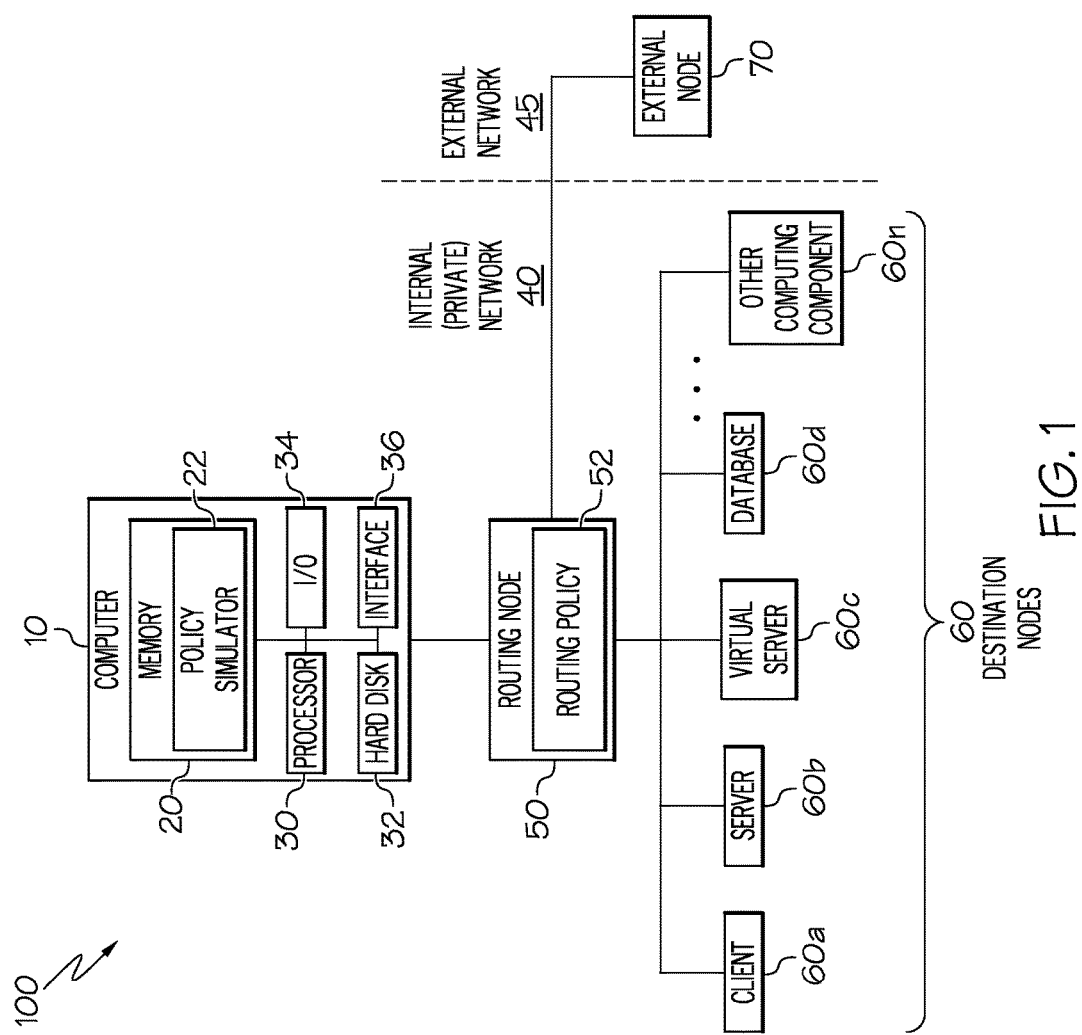
FIG. 1 illustrates a block diagram of a system for routing policy impact simulation in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Organizations use performance management tools to manage computing resources and network components for performance optimization, efficiency, and maintenance. For example, cloud service providers may use performance management tools to monitor various aspects of service operations, such as network component utilization and traffic. Network traffic monitoring solutions such as network flow analysis tools may help IT administrators optimize network infrastructure for better application performance. Such solutions may provide visibility into network applications, hosts, conversations and quality of service (QoS) information. This information enables proactive management of networks to reduce outages, solve network problems faster, and ensure efficient and cost-effective operations. Flow analysis tools may also help administrators align resources to support business results and gain credibility and support with data-driven decisions.

These tools may additionally provide large-scale data collection, warehousing, and analytics solutions that can help large organizations maximize return on their network infrastructure investments and lower the cost of network operations. For example, performance management tools may monitor, store, analyze and display large amounts of information for assuring service quality across large complex infrastructures, such as logging, storing, and displaying network component utilization data and network traffic data. Service providers may use performance management tools to improve network monitoring and delivery of services. Additionally, financial services, manufacturing, and healthcare organizations may use these tools to assure underlying network services for applications that drive business through customer interaction.

Certain performance management tools may include monitoring agents that monitor historical network activity. For example, packets received at a particular router may be inspected for information and stored for further analysis. Historical network data may be used for various aspects of performance management such as traffic trend analysis and configuration change simulation.

These tools may be used to manage local private networks, such as networks within a public or private cloud environment. Managed networks include various network component items such as routers, switches, hubs, servers, virtual components, and the like. In a cloud environment, local resources such as servers and the like are addressable via a host identifier that identifies each individual resource on the network. Routers are configured with these local addresses and network traffic is routed accordingly. For example, a router may interface with an external network. Network packets may be received at the router. The router determines where to route the incoming network packets.

These cloud environments may include one or more servers hosting one or more applications and services for use by an organization or the public. Each computing component, whether virtual or physical, may be connected to a local network in the cloud environment.

Computing components in a network each have at least one logical address that is generally assigned dynamically by a Dynamic Host Configuration Protocol (DHCP) server, or manually by an administrator. This address identifies the host and locates it on a network or subnet. IP addresses are generally divided into two parts, the network prefix and the host identifier. Hosts on a subnet may have the same network prefix. Packets may be routed across multiple networks via special gateway components, or routers, to a destination host. Alternatively, if the network prefixes of the destination and host are the same, packets may be routed directly to the destination within the subnet or local network. Thus, routers constitute the borders between subnets, and manage traffic between them. Routers enable a system to find a network path to another system.

A route includes a defined pair of addresses including a destination address and a gateway. The route or path indicates that when trying to get to the specified destination, packets should be sent through the specified gateway. The destination may include default, localhost, a MAC address, or a broadcast address, while gateways may specify where traffic should be routed through in order to get to the destination address. For example, if the destination prefix is localhost, the host identifier may be used to identify a network path to a component within the local network (the localhost prefix resolves to the local network gateway). As another example, a network prefix of an IP address is used to identify a particular gateway router while the host identifier is used to identify a particular destination component within the network. Packets are routed from the source router to the destination gateway router and to the destination host. As yet another example, a subnet mask is used to divide a network into smaller subnets by designating some high-order bits from the host identifier of an IP address as part of a subnet. Packets are routed from the source router to the destination gateway subnet router and to the destination host.

Routers may be configured with settings that control how packets are routed between networks. For example, a subnet mask may be configured to group high-order bits from the host id part of an IP address with the network prefix to create a subnet. The subnet mask may apply a bit-wise binary operation on the IP address of a packet to extract the host identifier. Router configuration settings may modify the subnet mask to create one or more subnets within a network. As another example, a network identifier may identify one or more local or external networks. Routers may have a particular gateway programmed for a predetermined one or more network identifiers. Thus, packets may be routed through the assigned gateway.

If the destination network prefix is not specified in the routing table and no known route for the network prefix exists at the router, then the packets may be routed to the gateway machine at the ISP. As yet another example, the routing table may specify a particular internal gateway to route traffic to for a particular network identifier. Thus, as illustrated by the various scenarios described above, routing configuration settings may have a dramatic effect on routing network packets.

Routing configurations are modified regularly. For example, when a new server is stood up, or a new application is initiated, network configuration settings for the machines and resources that service the application are modified in one or more network components. Particularly, in distributed systems, reliable communications between components within a network is crucial. Maintaining legacy applications and services is also crucial. For example, modifying routing configurations for a particular network allow network communications to and from a new service may effect legacy applications and services. These effects remain largely unknown until the configuration settings have been modified and any errors are uncovered.

Additionally, the cause of these errors in such legacy systems may not easily be discovered. For example, users of a legacy system may not be warned of a change to routing configurations. Thus, administrators may waste time in diagnosing problems with the legacy systems, when instead the problem was introduced by a routing configuration modification.

Thus, a need has arisen for systems that can mange and track changes to routing configurations to ensure that historical network traffic is only intentionally displaced by new configuration changes. The teachings of the present disclosure may present such a solution in the context of performance management applications.

In certain embodiments, a performance management application collects historical information regarding network traffic. For example, a router's network traffic may be monitored for network packets including path, header, payload, destination, and protocol information. These packets, or information regarding them, may be stored in a performance monitoring database. This historical network traffic information may be used to simulate effects of proposed routing rule changes. For example, simulation packets may be generated for each packet for which historical network information data is collected. These simulation packets may be routed in a routing simulation. One or more routers and hosts may also be simulated in the routing simulation. The simulation packets may be routed along routing paths by the one or more routers based on the proposed routing rules. Changes to the routing paths between the simulation and the historical routing paths of each network packet may be compared. The system may determine an unintended change in the network paths for a historical network packet and determine whether or not to apply the routing configuration change to the router.

In certain embodiments, one or more other considerations are considered when determining whether to apply the change, such as the importance of the historical network packet. For example, if the destination of the historical packet is obsolete, the system may ignore the change in path and may apply the routing change notwithstanding the unintended consequences.

In certain embodiments, various aspects of the historical network traffic are used to determine a network path change or whether or not to apply the routing modification to the router. For example, historical packet information may include network layer information such as protocol information (e.g., TCP/IP, UDP/IP, and/or FTP) and a destination application that the packet is routed to (e.g., a web server or an FTP server). The system may simulate the new routing configuration and may determine whether changes in the routing of historical network packets would cause errors. For example, if historical packet information regarding FTP packets was suddenly routed to a web server in the routing simulation, the system would detect and/or mitigate the modification. For example, the system may alert an administrator or may determine that it should not apply the routing configuration based on the change in the path.

In certain embodiments, the system may modify the routing configuration settings to mitigate detected problems. Using the example described above, the proposed routing configuration from the routing simulation may be modified to direct the packets to the FTP server, while still allowing the routing configuration changes to affect other network packets. For example, a carve-out in the rule may be created for the particular type of historical traffic impacted by the routing configuration setting.

The present disclosure contemplates management, simulation, and tracking of nearly any router settings, including but not limited to access control settings, application rule settings, auto channel and channel scan settings, DHCP server settings, DMZ settings, DNS settings, Dynamic DNS (DDNS) settings, firewall settings, firmware settings, gateway settings, filters, internet IP settings, MAC address settings, Mac address filter settings, max idle time settings, maximum transmission unit settings, port forwarding settings, point to point protocol over Ethernet (PPPoE) settings, pre-shared key settings, subnet mask settings, logging settings, visibility status settings, website filter settings, security settings, wireless channel settings, network name settings, wired equivalent privacy (WEP) and Wi-Fi Protected Access (WPA) settings, and security mode settings.

With reference to FIG. 1, a system 100 for routing policy impact simulation is illustrated in accordance with a non-limiting embodiment of the present disclosure. System 100 includes a computer 10 having a memory 20, processor 30, hard disk 32, input/output 34 and interface 36. Computer 10, using processor 30, loads instructions from hard disk 32 into memory 20 and executes them as processes, services, and applications, such as policy simulator 22. Computer 10 is connected to an internal private network 40 and external network 45 by routing node 50. Routing node 50 is configured with a routing policy 52. Routing node 50 connects various network components to each other via one or more of internal network 40 and external network 45. For example, client 60a, server 60b, virtual server 60c, database 60d, and other computing components 60n (collectively "destination nodes 60") are connected to computer 10 and external node 70 via routing node 50. System 100 conceivably includes many other routing nodes 50, external nodes 70, and destination nodes 60 that each communicate with each other. Further, various other networks and sub-networks are connected via various other gateways and/or routers.

Routing node 50 routes network traffic between and among destination nodes 60 and external node 70. In certain embodiments, routing node 50 routes traffic to other routing nodes. For example, routing node 50 connects local network 40 with other networks. Routing node 50 may be a gateway router and may connect to other gateway routers in a cloud environment. Routing node may rout packet traffic according to a routing policy 52. Routing policy 52 may specify one or more routing configuration settings for routing node 50. For example, routing policy 52 may specify a subnet mask for routing incoming network traffic to destination nodes 60.

Policy simulator 22 may retrieve historical network information from an external monitoring system, for example, via a database connection. The monitoring system may monitor routing node 50 using an agent or other method for monitoring network utilization and packet data. For example, historical network information may include information regarding the routing path, destination application, ports, protocols, and other packet information. A performance monitoring system may collect data regarding IP packets that are passed through one or more routing nodes, such as routing node 50. The data may include information regarding the destination host that the IP packets are routed to. This data may be stored in a database and/or otherwise passed to policy simulator 22 for simulation of network packet traffic.

An administrator may wish to apply a proposed routing policy to routing node 50. The proposed routing policy may differ from routing policy 52. For example, the proposed routing policy may change how certain IP packets are routed. In one example, IP packets with a particular network prefix are routed to a first predetermined network gateway based on routing policy 52. The proposed routing policy may impact routing of those IP packets, for example, by directing routing node 50 to route those IP packets within the local network. Thus, all network traffic received at routing node 50 may be directed to a corresponding host (destination nodes 60) within internal private network 40.

Such a proposed change may negatively impact traffic for certain applications. For example, client 60a may access a server connected via routing node 50 at a different gateway router. The proposed routing policy change may cause that traffic (i.e., those IP packets from client 60a with that destination host address) that were routed to the different gateway router to be routed internally to, for example, server 60b. This may cause applications running on client 60a to stop working. Further, these errors may be difficult to diagnose or trace to a routing policy configuration change.

Thus, policy simulator 22 may simulate these proposed changes to vet out possible unforeseen impacts on various other network traffic. Policy simulator 22 may gather historical network data from the network performance monitoring system database and use that data to construct simulated IP packets. Together with an understanding of the various destination hosts and the network layer protocols used in receipt of the various historical IP packets, policy simulator 22 may create simulated packets. For example, policy simulator 22 may construct simulation packets corresponding to each historical network packets monitored by the performance monitoring system. Various other aspects of performance monitoring information and network information may be incorporated in the simulated packet design.

In certain embodiments, a virtual network is constructed for simulating the routing of IP packets according to a proposed routing policy. For example, a snapshot of the landscape of the local network and one or more other connected networks may be generated during collection of the historical network data. A virtual network environment may be constructed for routing the simulated network packets. A router may be generated corresponding to routing node 50, and the proposed routing policy may be applied to the router. Packet routing may be simulated according to the proposed routing policy.

In certain embodiments, the simulation is not an actual simulation. Rather, the simulation involved determining routing characteristics of the network and computing the anticipated destination host and routing path for the packet based on the proposed routing policy. Accordingly, construction of a simulation environment may be avoided entirely in certain embodiments of the present disclosure.

The routing paths of each IP packet in the simulation may be compared to the routing paths captured by the performance monitoring system. For example, a simulated IP packet is generated for a particular historical IP packet that was monitored by a performance monitoring system. The path for the historical IP packet may be compared to the path for the simulated IP packet in the simulation. Thus, the simulated routing path and destination node are compared to the historical routing path and destination node. Changes are determined based on each IP packet's historical and simulation information.

Changes between routing paths may be traced to a specific setting in the routing configuration so that those settings may be addressed by an administrator. Thus, the administrator may modify the configuration settings or may approve the configuration settings as an intended consequence of his or her proposed routing policy. Policy simulator may make a determination as to whether to apply the proposed routing policy to routing node 50 based on the results of the simulation.

In certain configurations, the severity of the interruption may be assessed. For example, network interruptions may be detected as changes between the simulated routing path and the historical routing paths. Some changes may result in an interruption of the network traffic, for example with reference to the above described FTP/TCP example. Thus, the detected change in this scenario may lead to an interruption. Interruptions may be considered when evaluating the severity of path changes. Other factors may additionally be considered when evaluating path changes, such as the importance of an application associated with the network traffic. For example a client facing application is associated with particular IP packets based on the destination address and packet structure of the simulated IP packet. The importance of the change in the routing path may be estimated based on the destination application as determined with reference to the contents of the IP packet including header and payload information. For example, client facing applications may be the most important because any down time will reflect poorly on a company. Accordingly changes discovered in the simulated routing path of IP packets associated with client facing applications may be immediately escalated and may prevent implementation of a proposed routing policy.

In certain embodiments, packet structure of the payload of the packet may provide additional clues as to the intended destination of the IP packet. Thus, the simulated routing path may be evaluated in light of this additional information. For example, if the structure of the IP packet is compatible with the destination in the simulated routing path, no interruption or change may be triggered because this most likely is an intended change. Thus, by virtue of the simulated routing path not leading to any failure, the policy simulator 22 may determine that the new path was an intended consequence of the proposed routing policy.

In certain configurations, the proposed settings may be automatically modified to mitigate the perceived interruption or change. For example, a new rule or a modification to the proposed rule may be constructed to alleviate and prevent the perceived interruption or change. This new rule may include a carve-out exception for particular packets that are similar to those packets in the historical data for which the change or interruption was detected. For example, the carve-out may route additional new traffic based on the modified policy but may carve out an exception for future packets that are similar to those historical packets. The carve out may be implemented automatically, tested using the simulated routing packets and applied to the routing node 50 with the proposed routing policy.

IP addresses may be shared between internal network components and external network components. For example, the IP address 192.168.1.101 may be addressable to a local network component in addition to one, several, or many external network component. A router is configured with routing rules for routing traffic over a network path to a destination address. Particular rules may route traffic with a destination address in a particular range to a corresponding internal component, even though the destination address of the received packets may additionally resolve to external network components. Other traffic with unrecognized destination addresses may be routed to an external component for further routing. The managed network may be connected to an external network.

Figure 2:
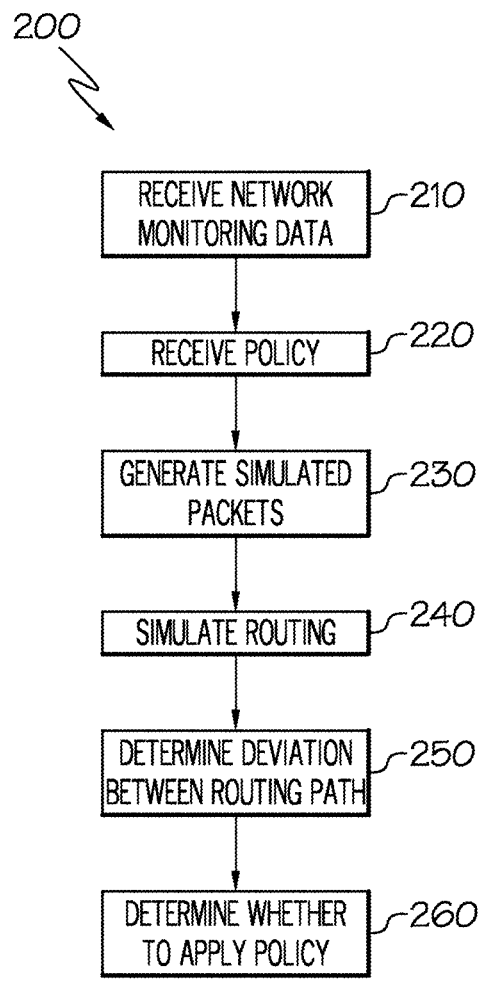
FIG. 2 illustrates a flow chart of a method for routing policy impact simulation in accordance with a non-limiting embodiment of the present disclosure.

With reference to FIG. 2, a method 200 for routing policy impact simulation is illustrated in accordance with another non-limiting embodiment of the present disclosure. At step 210, network monitoring data is received. For example, network monitoring data may be received from a performance management system that collects network data regarding system components from a private network. The performance management system may collect various information regarding each component of the network, including utilization rates, specifications, an information regarding network traffic. For example, network IP packet information may be collected and stored in a performance management database. Other various systems may access this data for use in various other management and monitoring processes.

At step 220, a proposed routing policy is received. The proposed routing policy is with respect to a particular node in the network, such as a router or gateway having a current routing policy currently implemented. For example, an administrator may wish to route traffic to a new gateway for a particular network prefix. However, this change may unintentionally affect local network traffic with a default route to an external node for a particular IP address that happens to have that same gateway. Thus, this traffic would unintentionally be routed to the new gateway and likely would not resolve to a host. However, when the administrator supplies the proposed policy change, he or she has no idea that this result may occur.

At step 230, simulated routing packets are generated. For example, a routing policy simulator may collect or receive IP packet information from a network monitoring system. IP packets may be reconstructed to generate simulated IP packets based on the historical network traffic.

At step 240, the simulated routing packets are routed according to the proposed policy to create a simulated routing. Information regarding a new simulated path for each simulated IP packet is generated based on the proposed routing policy. Thus, any changes in network traffic caused by the proposed policy may be determined.

In certain embodiments, the changes may be analyzed for interruptions and the interruptions may be evaluated for importance. Various other actions may be taken based on each of these determinations. For example, if a proposed routing policy causes an interruption in a service, the proposed routing policy may not be applied. As another example, a carve-out may be created in the proposed policy to preserve the fidelity of the routing path for the historical packets. As yet another example, the importance of the interruption is assessed. If the interruption is deemed unimportant, for example, because it relates to historical packets associated with an application that is no longer operational, the interruption may be ignored and the routing policy is applied to the routing node.

At step 250, deviations in the routing paths are determined. As described above, the simulated routing path for each IP packet is compared to the historical network path for the same. Deviations between each path are determined and analyzed.

At step 260, the system determines whether to apply the proposed policy to the routing node. In certain embodiments, a modified policy is applied to the routing node. In certain embodiments, no policy is applied to the routing node.

Figure 3:
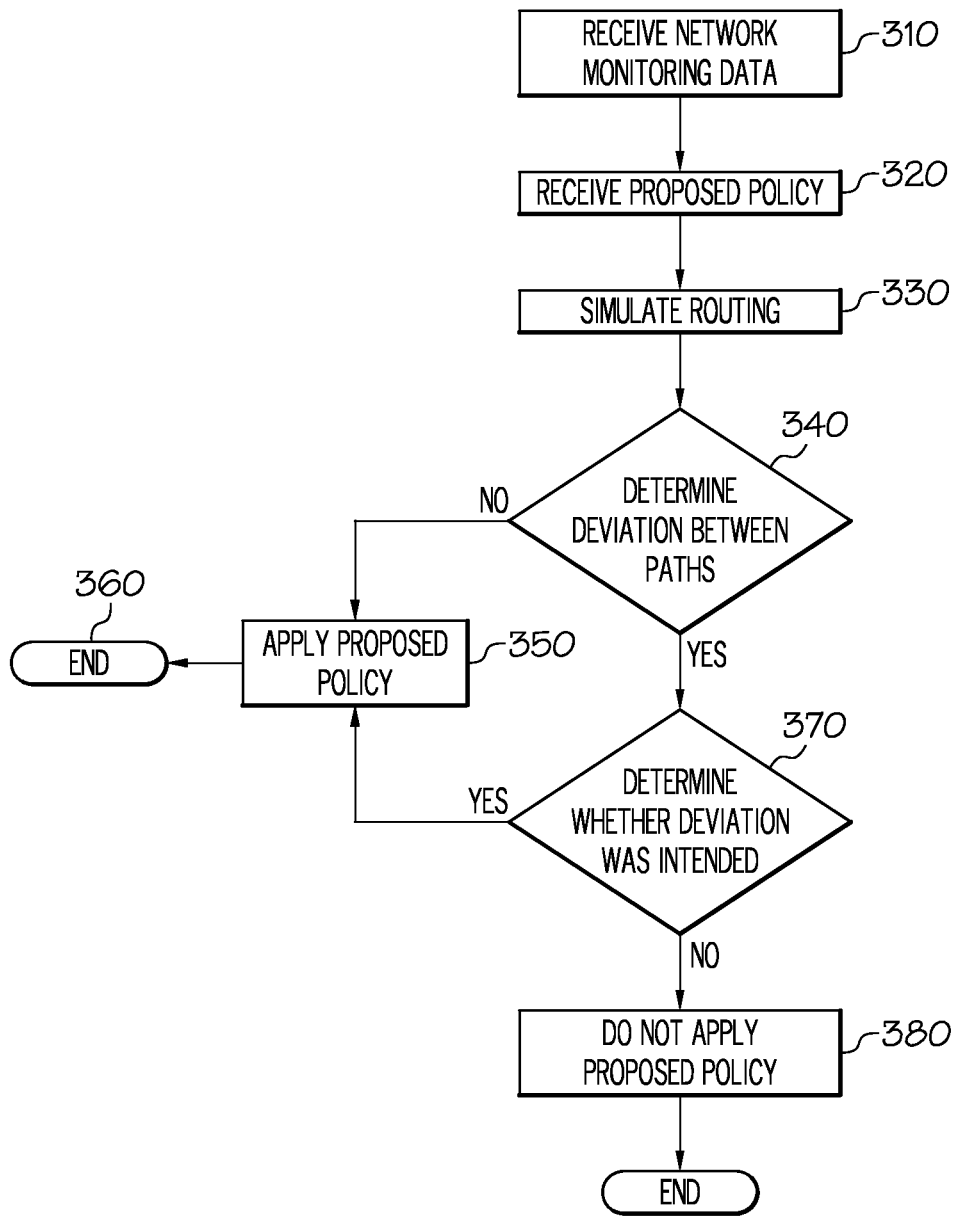
FIG. 3 illustrates a flow chart of a method for routing policy impact simulation in accordance with a non-limiting embodiment of the present disclosure.

With reference to FIG. 3, a method for routing policy impact simulation is illustrated in accordance with yet another non-limiting embodiment of the present disclosure. Steps 310-340 mirror those of steps 210-250 in FIG. 2; however, at step 340, if no deviation is detected between the simulated path and the historical path, then the proposed policy is automatically applied to the routing node.

On the other hand, if a deviation is determined between the simulated path and the historical path, the method continues to step 370, where it is determined whether the deviation in the routing paths was intended. This may be accomplished in a variety of ways, including using additional system information regarding applications an processes associated with particular network traffic. For example, protocol information for a series of applications implemented by one or more destination servers in a local network is consulted. The simulated routing path may route future packets to a different server; however, that server may be running or hosting an application that is compatible with the simulated packets. Thus, the system may analyze whether the routing policy modification is likely to lead to network interruptions or down time.

At step 370, if the system determines that the deviation was intended then the proposed policy is applied to the routing node. However, if the system determines that the deviation was not intended, then the proposed policy is not applied to the routing node. In alternative implementations, the routing policy may be modified to minimize the negative impacts of a routing policy change, such as by creating a new rule to shield future traffic that is similar to the historical traffic.

The teachings of the present disclosure may be particularly applicable in the SAAS context. For example, network traffic routing is particularly important in these systems because many are hosted in virtual environments. Thus, the routing policies are responsible for routing traffic to the virtual components in the correct manner in order to meet contract requirements for availability and other Quality of Service metrics. A proposed routing policy implemented in the blind may knock out service for a customer paying top dollar for service availability. It may be virtually impossible to detect and avoid repercussions of routing policy modifications using existing technologies. Accordingly, the teachings of the present disclosure may present a solution that enables network administrators to modify their network routing policies in confidence, knowing that the proposed routing policies will be vetted against historical packet data to determine regressions introduced by the new routing policy.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    receiving network monitoring data for a plurality of internet protocol ("IP") packets, each having been routed along a respective initial path according to a predetermined policy by a routing node in a packet-switched network;
    receiving a proposed policy designed to cause an intended change in routing future IP packets;
    generating a corresponding simulation packet for each of the plurality of IP packets based on the network monitoring data;
    routing each of the simulation packets along a respective simulated path according to the proposed policy to simulate routing the future IP packets;
    determining, for a particular IP packet in the plurality of IP packets, (1) a deviation between the respective simulated path for the corresponding simulation packet and the respective initial path, and (2) an incompatibility between a recognized packet payload structure of the corresponding simulation packet and an expected packet payload structure for a destination host in the simulated path, wherein the incompatibility is recognized by determining that receipt of the particular IP packet at the destination host would cause an error in the destination host and wherein the recognized and expected packet payload structures each correspond to a different protocol; and
    determining whether to apply the proposed policy to the routing node based on whether the intended change in routing includes the deviation and whether the incompatibility was determined.

2. The method of claim 1, further comprising:
    determining a destination application in the respective simulated path for the corresponding simulation packet for the particular IP packet; and
    determining whether the particular IP packet is compatible with the destination application.

3. The method of claim 1, wherein the respective initial path for the particular IP packet includes an internal destination node in a local network, and wherein the respective simulated path for the corresponding simulation packet for the particular IP packet includes an external destination node in an external network.

4. The method of claim 3, further comprising:
    determining that the intended change in the routing includes routing future packets to the external destination node; and
    applying the proposed policy to the routing node to route the future IP packets.

5. The method of claim 1, wherein the particular IP packet is associated with an IP address that is addressable to each of a first node in a private network and a second node in an external network, and wherein the proposed policy comprises routing the particular IP packet to the first node in the private network.

6. The method of claim 1, further comprising:
    formatting for display a report comprising information regarding how the proposed policy will affect routing the future IP packets based on the simulated routing.

7. The method of claim 1, further comprising applying the proposed policy to the routing node to route the future IP packets at the routing node according to the proposed policy.

8. A computer configured to access a storage device, the computer comprising:
    a processor; and
    a non-transitory, computer-readable storage medium storing computer-readable instructions that when executed by the processor cause the computer to perform:
        receiving network monitoring data for a plurality of internet protocol ("IP") packets, each having been routed along a respective initial path according to a predetermined policy by a routing node in a packet-switched network;
        receiving a proposed policy designed to cause an intended change in routing future IP packets;
        generating a corresponding simulation packet for each of the plurality of IP packets based on the network monitoring data;
        routing each of the simulation packets along a respective simulated path according to the proposed policy to simulate routing the future IP packets;
        determining, for a particular IP packet in the plurality of IP packets, (1) a deviation between the respective simulated path for the corresponding simulation packet and the respective initial path, and (2) an incompatibility between a recognized packet payload structure of the corresponding simulation packet and an expected packet payload structure for a destination host in the simulated path, wherein the incompatibility is recognized by determining that receipt of the particular IP packet at the destination host would cause an error in the destination host, and wherein the recognized and expected packet payload structures each correspond to a different protocol; and determining whether to apply the proposed policy to the routing node based on whether the intended change in routing includes the deviation and whether the incompatibility was determined.

9. The computer of claim 8, wherein the computer-readable instructions further cause the computer to perform:
determining a destination application in the respective simulated path for the corresponding simulation packet for the particular IP packet; and
determining whether the particular IP packet is compatible with the destination application.

10. The computer of claim 8, wherein the respective initial path for the particular IP packet includes an internal destination node in a local network, and wherein the respective simulated path for the corresponding simulation packet for the particular IP packet includes an external destination node in an external network.

11. The computer of claim 10, wherein the computer-readable instructions further cause the computer to perform:
determining that the intended change in the routing includes routing future packets to the external destination node; and
applying the proposed policy to the routing node to route the future IP packets.

12. The computer of claim 8, wherein the particular IP packet is associated with an IP address that is addressable to each of a first node in a private network and a second node in an external network, and wherein the proposed policy comprises routing the particular IP packet to the first node in the private network.

13. The computer of claim 8, wherein the computer-readable instructions further cause the computer to perform:
formatting for display a report comprising information regarding how the proposed policy will affect routing the future IP packets based on the simulated routing.

14. The computer of claim 8, wherein the computer-readable instructions further cause the computer to perform applying the proposed policy to the routing node to route the future IP packets at the routing node according to the proposed policy.

15. A computer program product comprising:
a non-transitory computer-readable storage medium having computer-readable program code embodied therewith, the computer-readable program code comprising:
computer-readable program code configured to receive network monitoring data for a plurality of internet protocol ("IP") packets, each having been routed along a respective initial path according to a predetermined policy by a routing node in a packet-switched network;
computer-readable program code configured to receive a proposed policy designed to cause an intended change in routing future IP packets;
computer-readable program code configured to generate a corresponding simulation packet for each of the plurality of IP packets based on the network monitoring data;
computer-readable program code configured to route each of the simulation packets along a respective simulated path according to the proposed policy to simulate routing the future IP packets;
computer-readable program code configured to determine, for a particular IP packet in the plurality of IP packets, (1) a deviation between the respective simulated path for the corresponding simulation packet and the respective initial path, and (2) an incompatibility between a recognized packet payload structure of the corresponding simulation packet and an expected payload structure for a destination host in the simulated path, wherein the incompatibility is recognized by determining that receipt of the particular IP packet at the destination host would cause an error in the destination host, and wherein the recognized and expected packet payload structures each correspond to a different protocol; and
computer-readable program code configured to determine whether to apply the proposed policy to the routing node based on whether the intended change in routing includes the deviation and whether the incompatibility was determined.

16. The computer program product of claim 15, wherein the computer-readable program code further comprises:
computer-readable program code configured to determine a destination application in the respective simulated path for the corresponding simulation packet for the particular IP packet; and
computer-readable program code configured to determine whether the particular IP packet is compatible with the destination application.

17. The computer program product of claim 15, wherein the respective initial path for the particular IP packet includes an internal destination node in a local network, and wherein the respective simulated path for the corresponding simulation packet for the particular IP packet includes an external destination node in an external network.

18. The computer program product of claim 17, wherein the computer-readable program code further comprises:
computer-readable program code configured to determine that the intended change in the routing includes routing future packets to the external destination node; and
computer-readable program code configured to apply the proposed policy to the routing node to route the future IP packets.

19. The computer program product of claim 15, wherein the particular IP packet is associated with an IP address that is addressable to each of a first node in a private network and a second node in an external network, and wherein the proposed policy comprises routing the particular IP packet to the first node in the private network.

20. The computer program product of claim 15, wherein the computer-readable program code further comprises:
computer-readable program code configured to format for display a report comprising information regarding how the proposed policy will affect routing the future IP packets based on the simulated routing.

* * * * *